United States Patent [19]

Fedeli

[11] Patent Number: 4,637,203
[45] Date of Patent: Jan. 20, 1987

[54] GRASS SHAVING MACHINE

[76] Inventor: Luisa Fedeli, Via dei Gracchi, 26, 20146-Milano, Italy

[21] Appl. No.: 758,952

[22] Filed: Jul. 25, 1985

Related U.S. Application Data

[63] Continuation of Ser. No. 628,243, Jul. 6, 1984, abandoned.

[51] Int. Cl.⁴ ............................................. A01D 35/22
[52] U.S. Cl. ...................................... 56/202; 56/320.2
[58] Field of Search ....................... 56/202, 16.6, 320.2

[56] References Cited

U.S. PATENT DOCUMENTS 3,827,220  8/1974  Seidel ................................. 56/320.2
3,949,540  4/1976  Christopherson .................... 56/202
4,203,276  5/1980  Plamper .............................. 56/202

Primary Examiner—Jay N. Eskovitz
Attorney, Agent, or Firm—Bucknam and Archer

[57] ABSTRACT

There is disclosed a mowing machine comprising at least a grass cutting blade, rotating about an axis substantially perpendicular to the ground and housed within a casing, open at the bottom and communicating with a cut grass conveying duct 15 for discharging the cut grass which comprises a movable wall 17 at the bottom tiltable towards the inlet mouth of a cut grass collecting vessel 3 effective to be associated with the cut grass discharging mouth of the conveying duct.

5 Claims, 11 Drawing Figures

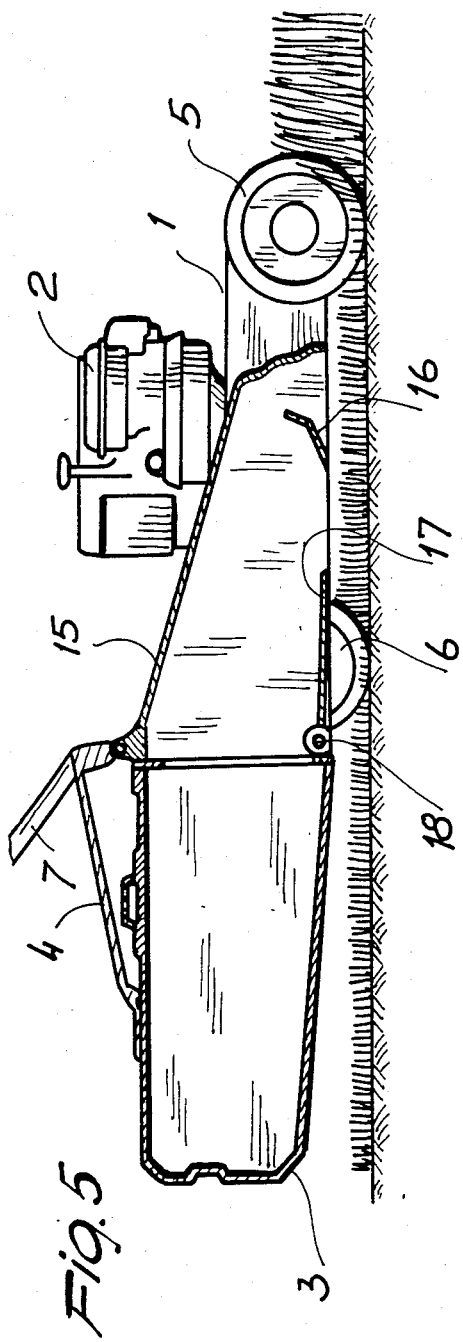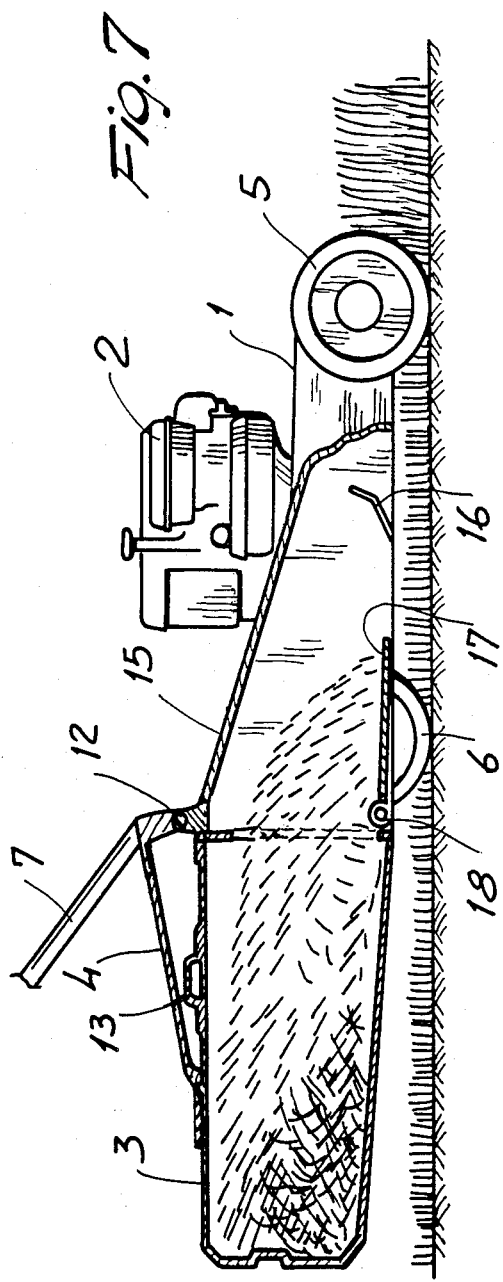

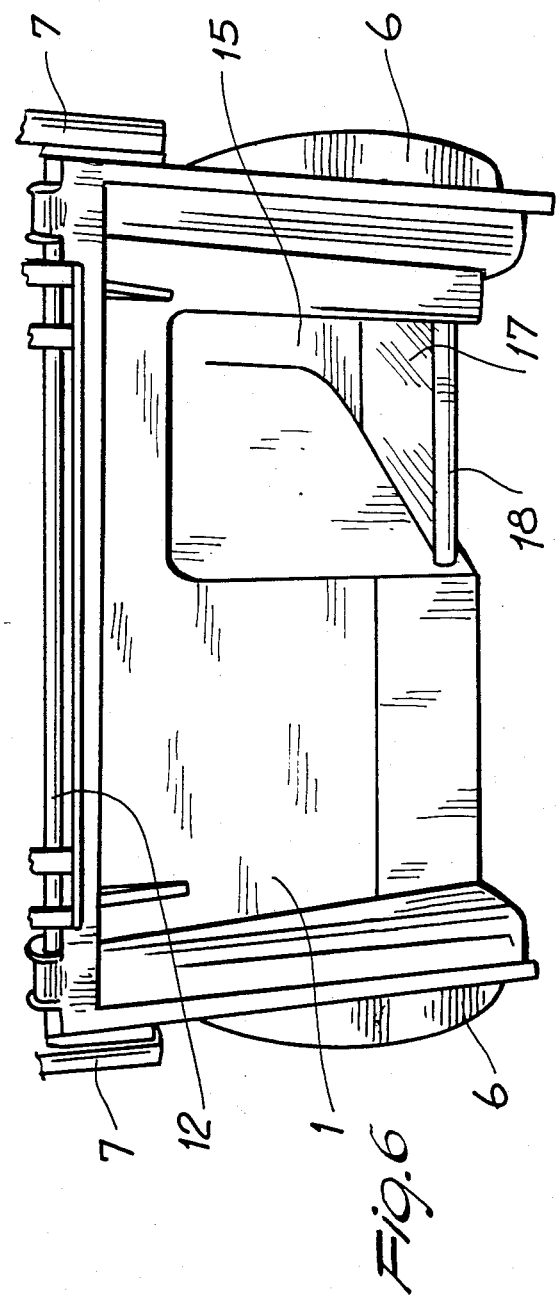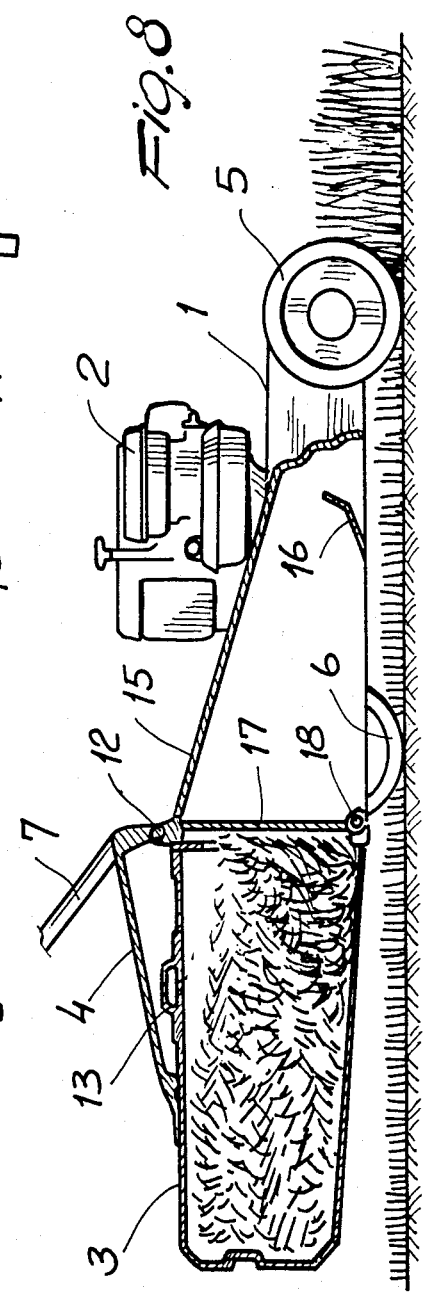

GRASS SHAVING MACHINE

This is a continuation of application Ser. No. 628,243, filed July 6, 1984 now abandoned.

DESCRIPTION

The present invention relates to an improved mowing (grass shaving) machine.

As it is known, there are commercially available several types of rotating mowing machines, which are provided with a driving assembly operating, either directly or indirectly, one or more grass cutting blades, rotating about an axis substantially perpendicular to the ground and, in some cases, also the device to cause the mowing machine to advance.

The mentioned mowing machines are provided with a casing which houses, at the top and laterally, the cutting blade or blades.

The casing is also effective to prevent the mowing machine operator from accidentally contacting the rotating blades, and prevent the rotating blades from projecting cut grass or other bodies on the ground in undesired directions.

The carter is frequently provided with a conveying duct, for evacuating cut grass towards the rear of the mowing machine, in such a way as to afford the possibility of applying a vessel for said cut grass at the outlet mouth of said duct.

In the case of a mowing machine operated by an operator walking behind the machine itself, the casing is caused to rest on the ground by means of three of four wheels or two rollers, or a wheel and roller combination.

In some types of mowing machines, wheels or rollers are also used for the advancing of the mowing machine, as driven by the driving engine.

In that case, the cut grass collecting vessel is usually coupled to the casing in such a way that, as the opeartor adjust the grass cutting level or height of the machine, said vessel is caused to rise or lower together with the casing or the cutting blades.

On the other hand, in the case of mowing machines driven by an operator sitting on the machine itself, the latter is usually of a comparatively more complex structure: the casing housing the cutting mechanism of the mowing machine is usually supported by the main frame of the machine.

The mentioned main frame supports the driver, the guiding and advancing members, as well as the grass cutting and collecting member.

Usually the grass cutting members (blades and blade encompassing casing) are displaced vertically with respect to the ground, in such a way as to afford the possibility of adjusting the cutting level, whereas all the other members, including the cut grass collecting vessel, are supported by the main frame and are not displaced as the operator adjusts the cutting level.

In that case, the outlet mouth of the conveying duct, as formed in said casing, is arranged at the top or at the bottom, with respect to the inlet mouth of said cut grass collecting vessel.

Also known is the fact that a mowing machine is used both in the case when the grass is dry and in the case when said grass is wet.

As the moisture conditions of the grass change, also the working conditions change, as well as the cut grass collecting conditions.

Whereas a dry grass is easy to cut and collect, since the cut grass portions are held separated and hence are light, a wet grass is difficult to cut and collect. In fact, the cut grass portions, or fragments are of a comparatively greater weight and accordingly they may hardly be projected by the blades into the inside of the collecting vessel.

Moreover, the surface moisture causes grass agglomerates to be formed which are of great weight and may be hardly conveyed to the collecting vessel.

The presently commercially available mowing machines operate under heavy working conditions, therein the conveyor, as formed in the casing of the machine, is obstructed by cut grass not projected into the inside of said cut grass collecting vessel.

Thus, under the mentioned heavy working conditions, the operator is compelled to frequently clean the conveying duct of the casing.

It should be apparent that this manual intervention is an uncomfortable operation, mainly in the case of a mowing machine driven by an operator sitting on the main frame of the machine itself.

Accordingly, the task of the present invention is to overcome the above mentioned drawbacks by affording the possibility of emptying the cut grass conveying duct by means of an easy remote operation and without any manual intervention by the mowing machine operator.

Within the above task, it is a main object of the present invention to provide such a mowing machine structure in which all of the components members thereof are rationally arranged and designed, thereby providing a machine very safe for the operator.

Another object of the invention is to provide a mowing machine with a cut grass collecting vessel having a very high compacting capacity, thereby reducing to a minimum the number of emptying operations and accordingly accelerating the grass cutting work.

Yet another object of the invention is to provide such a mowing machine which is effective to prevent cut grass from accumulating on the ground.

According to one aspect of the present invention, the above task and objects, as well as yet other objects which will become more apparent thereinafter, are achieved by an improved mowing machine comprising at least one grass cutting blade, rotating about an axis substantially perpendicular to the ground, and housed within a casing, open at the bottom, said casing communicating with a cut grass conveying duct for discharging said cut grass, provided with a top wall coupled to side walls substantially perpendicular to the ground, characterized in that it comprises a movable wall forming at least partially the bottom or lower portion of said conveying duct and tiltable towards the inlet mouth of the cut grass collecting vessel, effective to be associated with the cut grass discharging mouth of said conveying duct.

Further characteristics and advantages of the mowing machine according to the present invention will become more apparent thereinafter from the following detailed description of a preferred embodiment, illustrated by way of example and not of limitation in the accompanying drawings, where:

FIG. 5 is a schematic cross-sectional view illustrating a mowing machine of the type of FIG. 1 to which there is applied the movable wall according to the present invention.

FIG. 6 is a perspective view illustrating the discharging mouth of the cut grass conveying duct.

FIG. 7 illustrates the mowing machine of FIG. 5 under a condition of maximum filling, with the cut grass arranged also in the discharging duct.

FIG. 8 illustrates the mowing machine of FIG. 7 after the tilting of the movable wall.

Figure 1:
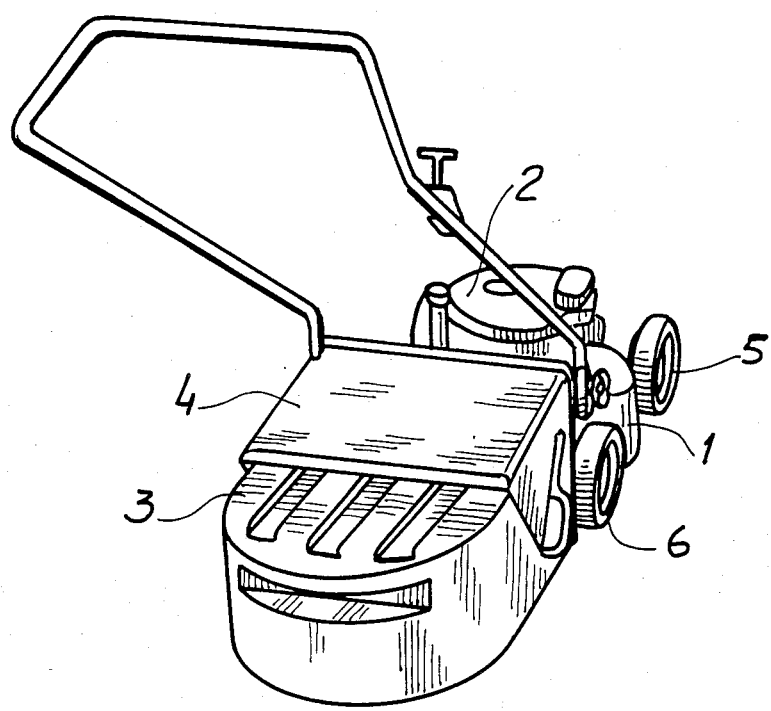
FIG. 1 is a schematic view illustrating a wheeled mowing machine provided for being driven by a walking operator.
Figure 2:
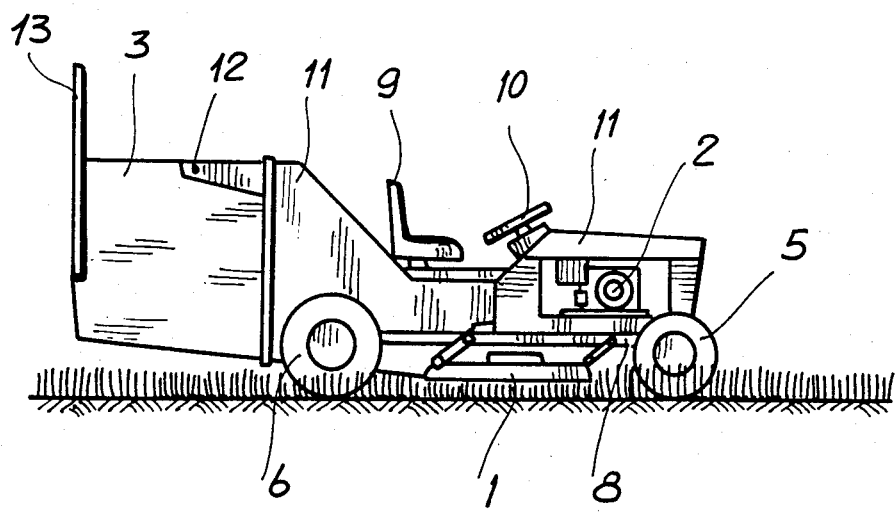
FIG. 2 illustrates a mowing machine effective to be operated by a sitting operator.

With reference to the above figures, the mowing machine according to the present invention comprises a casing, indicated overally at 1, in the inside of which there are arranged grass cutting members which are operated or driven either directly or indirectly by an engine 2.

On the rear portion of said casing there is mounted a cut grass collecting vessel, indicated at 3, which is located at the discharging mouth of said conveying duct.

Over the casing a baffle member 4 may be arranged, which is effective both to hold in its position the vessel 3 and to protect the cut grass outlet mouth, as the vessel is disengaged.

More specifically, the casing of the mowing machine driven by a walking operator is mounted on one or two front wheels 5 and on one or two rear wheels 6 which may possibly be replaced by one or more rollers.

A suitable handle 7 affords the possibility of driving said mowing machine.

In case the mowing machine is operated by a sitting operator, the casing is usually suspended or supported on the main frame of the machine.

Said main frame, indicated at 8, supports the engine 2, the seat 9 and the driving members 10.

The mowing machine is also provided with front wheels 5, which may be steered, and with one or two rear wheels 6, generally of the driving type.

A suitable body 11 covers the engine and the operating or driving members.

The cut grass collecting vessel 3 is articulated about an axis 12, arranged in such a way as to permit to carry out the emptying operation, for example by operating a handle 13 associated with said vessel.

While on the mowing machine with a sitting operator the cut grass collecting vessel, usually of large and heavy structure, is generally fixed on the machine and articulated thereto in order to be discharged by a simple rotation, with a consequent raising of its rear portion, in a mowing machine with a walking operator the latter may select the way in which the collecting vessel will be emptied.

Figure 3:
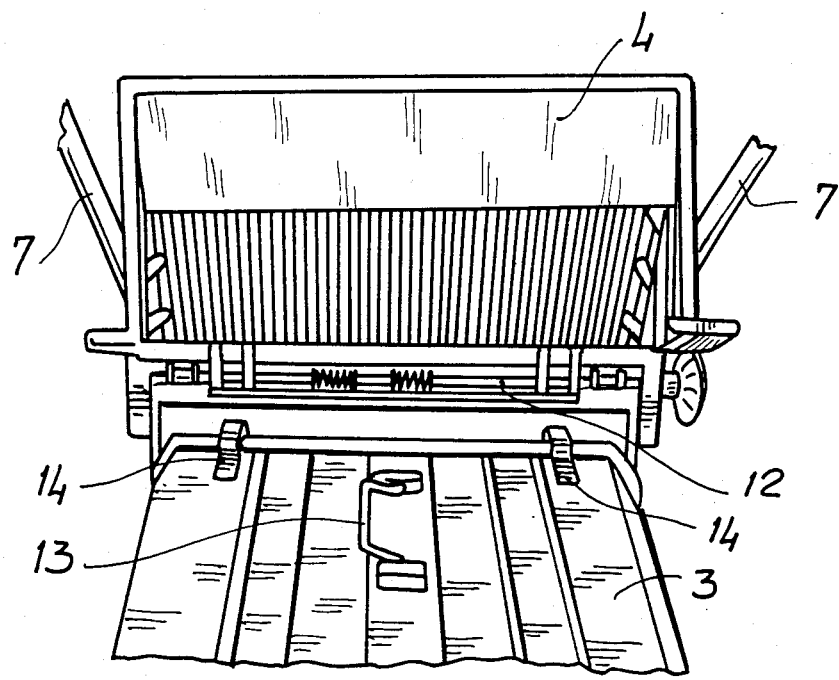
FIG. 3 illustrates the rear portion of the mowing machine of FIG. 1 as the cut grass collecting vessel is removed therefrom.

In other words, the operator may disengage the vessel from the pin 12, possibly after having raised the baffle 4, the handle 13 facilitating that operation, as it should be apparent from FIG. 3.

The hook members 14, applied on the vessel 3, act to accelerate that operation.

It is also possible to raise the rear portion of the vessel, as held in position by the baffle 4, by causing it to pass through the handle 7.

Figure 4:
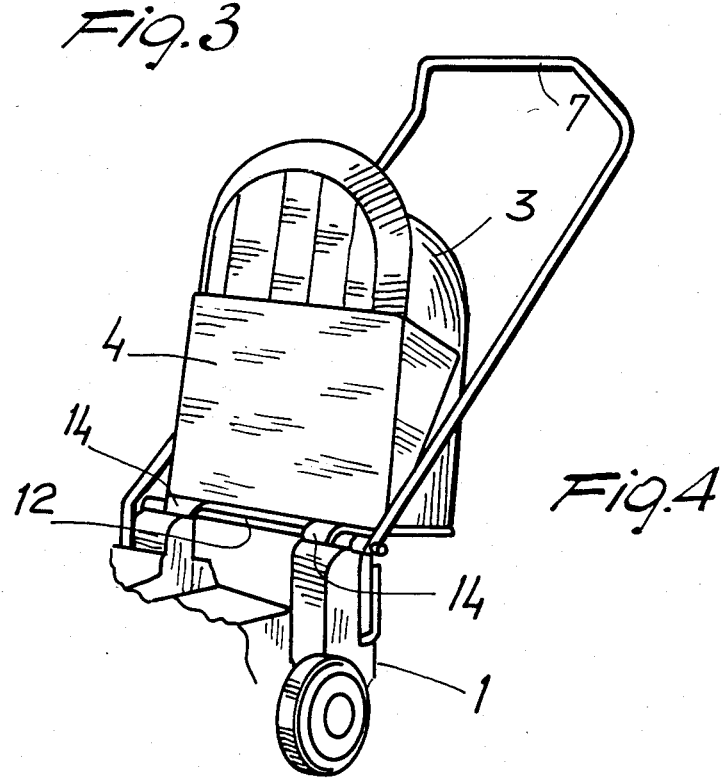
FIG. 4 illustrates the emptying operation for the collecting vessel of the mowing machine illustrated in FIG. 1.

The hook members 14 facilitate the pivoting of the vessel about the pin 12, thereby assuring the rotation of the vessel itself (FIG. 4).

A main feature of the invention is better illustrated in FIGS. 5 to 11.

These figures show that the rotating blade 16 projects the cut grass outside of the casing into the conveying duct 15. The latter has a cross-section which increases and raises towards the discharging mouth, in order to faciliate the removal of cut grass.

In the prior art, the bottom portion of the conveyor is a free one or it may be closed by a fixed wall.

The main feature of the mowing machine according to the present invention is that there is provided a movable wall 17, which forms at least partially the lower or bottom portion of the conveying duct and is able of rotating about an axis 18, arranged on the rear and bottom portion of the conveyor 15.

With the mentioned structure, the rotation of the bottom portion of the conveyor will cause said movable walls to rotate upwardly and rearwardly, in such a way as to be located substantially vertically in the inside of the conveyor, at the discharging mouth whereof, that is near the inlet mouth of the cut grass collecting vessel, as it is better illustrated in FIGS. 5 and 6.

The upwardly rotation of the movable wall 17 may be obtained in several ways.

That rotation occurs before the disengaging of the vessel by the operator, or it is timed with the rotation of said vessel, in such a way that the rotating blade is prevented from projecting objects outside of the conveyor during the raising step of the collecting vessel.

As it should be apparent, the timing system for timing the lower or bottom wall rotation and the discharging of the cut grass collecting vessel does not pertain to the invention.

In fact, thee invention simply provides for the arrangement of a movable wall which, as it is caused to rotate, is effective to 'clean' the conveying duct, thereby permitting the cut grass to be compacted in an optimal way in the inside of the collecting vessel.

Figure 10:
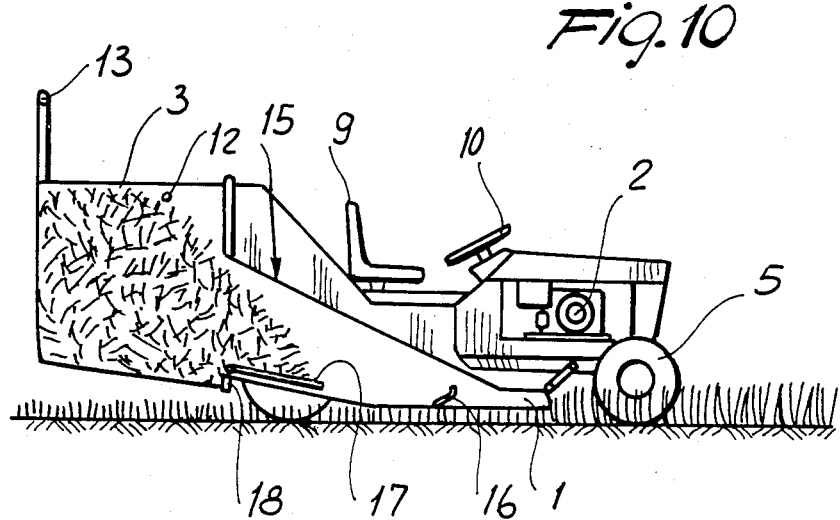
FIG. 10 is a schematic view illustrating a mowing machine with a sitting operator, where the casing and the conveying duct are also illustrated in cross section.

With reference to FIGS. 7 and 10, there is illustrated therein the operative condition of the cut grass collecting vessel and of the casing of the mowing machine, respectively a walking operator mowing machine and a sitting operator mowing machine, as the collecting vessel is completely full and a portion of the cut grass has been accumulated in the conveyi duct, that is at the time when the collecting vessel is to be emptied.

FIG. 8 schematically illustrates the condition of the cut grass collecting vessel of a walking operator mowing machine as, after having rotated the movable bottom wall according to the present invention, the vessel is ready to be disengaged from the mowing machine, in order to be emptied.

It should be apparent that the grass which has been deposited in the conveyor, that is outside of the collecting vessel, is pushed, because of the rotation of the bottom movable wall, inside said vessel.

The latter, accordingly, is able of containing a larger amount of cut grass, thereby recovering cut grass which, in the conventional mowing machines, would have been left on the ground or in the conveyor, with a consequent requirement of carrying out a manual operation for removing it.

Figure 9:
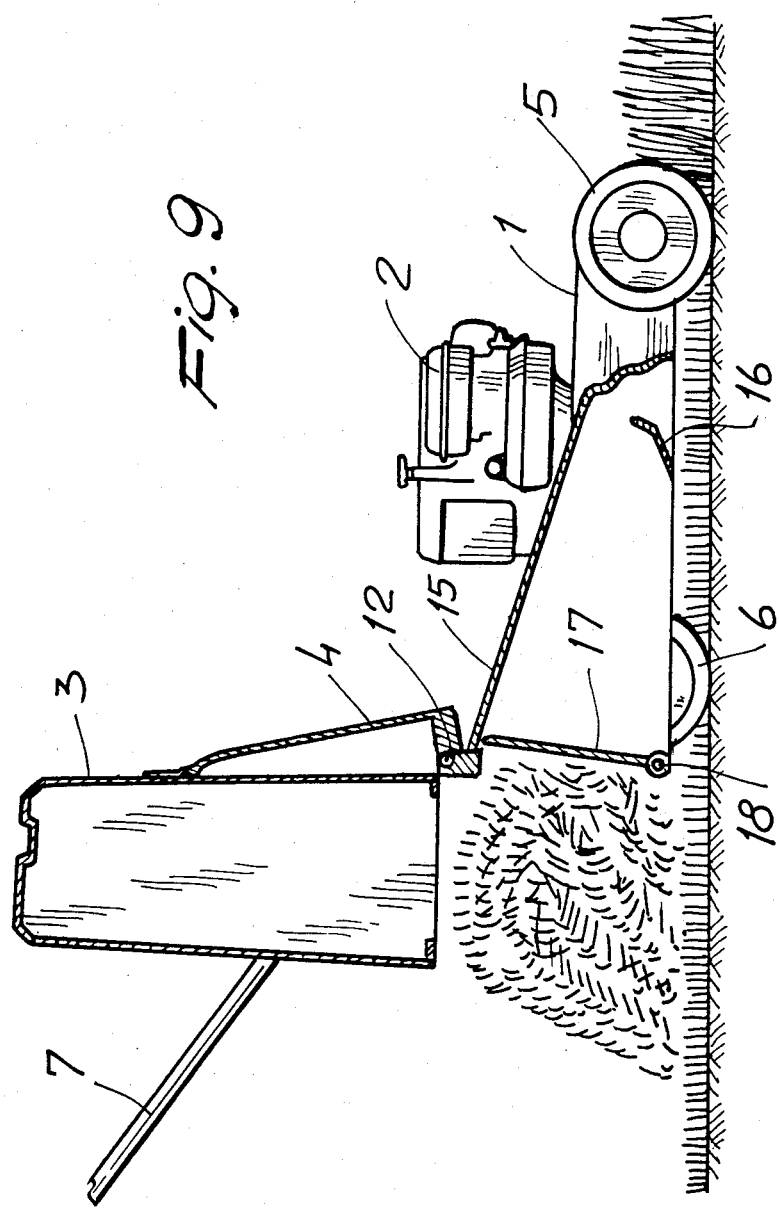
FIG. 9 illustrates the mowing machine of FIG. 7 with the cut grass collecting vessel emptied by raising its rear portion and with the formation on the ground of cut grass heaps.
Figure 11:
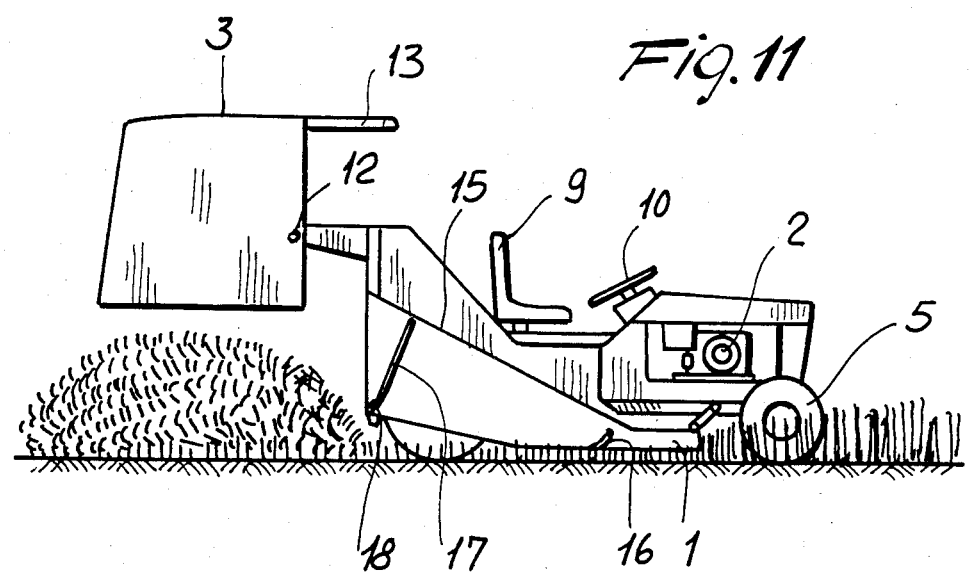
FIG. 11 illustrates the mowing machine of FIG. 10 with the cut grass collecting vessel in a completely raised condition, for the discharging.

FIGS. 9 and 11 illustrate, schematically, the emptying condition of the collecting vessel of a walking operator mowing machine and a sitting operator mowing machine respectively, as the cut grass collecting vessel is discharged by upwardly rotating the rear wall of the vessel, in such a way as to leave on the ground heaps of cut grass.

Also in that case, it will be apparent the advantage of the bottom movable wall according to the present invention, since the discharged grass is better collected and the conveyor will be devoid of any amounts of cut grass therein.

Accordingly, the cut operation may be started again, after having emptied the vessel, without the need of manually cleaning the conveying duct.

From the above disclosure it should be apparent that the mentioned movable walls is able of providing the mowing machine with great advantages, since the bottom movable wall of the conveying duct is held in such a position which is parallel or nearly parallel to the ground, during the operation, in such a way as to close the bottom portion of said conveying duct and collect that cut grass which is not able of entering the collecting vessel.

Moreover, at the end of the cutting operation, the operator may cause the bottom movable wall to rotate about the articulated side whereof, in such a way that said movable wall will be compelled to rotate rearwardly, thereby closing the outlet mouth of the conveying duct and, contemporaneously, the inlet mouth of the cut grass vessel.

It should be apparent that, owing to the mentioned rotation of said movable wall, a great part of the cut grass outside of the vessel will be pushed into said vessel and compacted therein, thereby emptying the conveying duct.

At the end of its rotation the movable wall will be in a perpendicular or nearly perpendicular position with respect to the ground.

Such a characteristic improves the cut grass transfer towards said vessel.

Simultaneously the discharging mouth of the cut grass conveying duct is closed by said movable wall thereby preventing any bodies sisceptible to be present on the ground from being projected outside of the duct by the rotating cutting blade.

The operator, moreover, is prevented from a accidentally contacting the cutting blade.

Obviously, asuitable coupling device will be provided effective to prevent the operator from taking up or rotating the cut grass vessel before the conveyor movable wall has been rotated in a sufficient way to assure the closure of the discharging mouth of the conveying duct and the discharging of the grass collected therein.

Thus, both the grass collection and the operation safety will be improved.

In practicizing the invention the used materials provided that they are compatible with the intended use, as well as the contingent shape and size, may be anyone according to the requirements.

I claim:

1. A grass mowing machine comprising a frame, an engine supported by the frame, a casing having a lowermost edge and being supported by said frame, said casing housing at least one grass cutting blade rotatable around an axis perpendicular to the ground, said casing being open at the bottom and being in communication with the cut grass, a conveyor duct for conveying the cut grass, said conveyor duct having an outlet and an enlarged cross-section at said outlet thereof, a vessel for collecting the cut grass at the rear of said casing, said vessel having an inlet, said vessel being located with its inlet at the outlet of said conveyor duct, the bottom portion of said conveyor duct being formed at least partially of a movable wall mounted at the lower portion of said casing at the rear and the top of said casing and being tiltable towards the inlet of said vessel, said movalbe wall having a perimetrical contour fitting said conveyor duct whereby said movable wall pushes grass in said conveyor duct into said vessel when said movable wall is rotated toward said inlet of said vessel, and wherein said movable wall is located substantially at the level of said lowermost edge of said casing and being parallel to the ground whereby it closes said conveyor duct during the grass cutting operation, and is tiltable to be arranged vertically, in a tilted position, during the cut grass discharging operation, said movable wall being rotatable upwardly and rearwardly to said tilted position.

2. The mowing machine according to claim 1, which is operated by an operator, wherein said movable wall in its tilted position acts as a closure member for said outlet of said conveyor duct thus preventing the operator from accidentally accessing said rotating blade.

3. The mowing machine according to claim 1, wherein when said movable wall is rotated to push grass in said conveyor duct into said vessel and is rearwardly tilted it is effective to compact the cut grass in said vessel.

4. The machine according to claim 1 further comprising a baffle member located above said casing and wherein said vessel is mounted at the top of said casing.

5. The machine according to claim 1, wherein said outlet of said conveyor duct, said cross-section of said conveyor duct and said movable wall having substantially the same dimensions.

* * * * *